US007659505B2

(12) United States Patent
Jolliffe et al.

(10) Patent No.: US 7,659,505 B2
(45) Date of Patent: Feb. 9, 2010

(54) ION SOURCE VESSEL AND METHODS

(75) Inventors: Charles Jolliffe, Schomberg (CA); Gholamreza Javahery, Kettleby (CA); Lisa Cousins, Woodbridge (CA); Serguei Savtchenko, Woodbridge (CA)

(73) Assignee: Ionics Mass Spectrometry Group Inc., Bolton, Ontario (CA)

( * ) Notice: Subject to any disclaimer, the term of this patent is extended or adjusted under 35 U.S.C. 154(b) by 170 days.

(21) Appl. No.: 12/024,752

(22) Filed: Feb. 1, 2008

(65) Prior Publication Data

US 2009/0194687 A1 Aug. 6, 2009

(51) Int. Cl.
*H01J 49/26* (2006.01)
*H01J 49/10* (2006.01)
*B01D 59/44* (2006.01)

(52) U.S. Cl. ....................... 250/288; 250/281; 250/282; 250/423 R; 250/424; 315/111.81; 315/111.91; 438/961

(58) Field of Classification Search ................ 250/288, 250/281, 282, 423 R, 424; 315/111.81, 111.91; 438/961
See application file for complete search history.

(56) References Cited

U.S. PATENT DOCUMENTS 5,463,220 A 10/1995 Young et al.
6,646,267 B1 11/2003 Fischer et al.
6,992,299 B2 1/2006 Lee et al.
7,091,477 B2 8/2006 Jolliffe et al.
7,098,452 B2 8/2006 Schneider et al.
7,211,791 B2 5/2007 Miller et
7,399,958 B2 * 7/2008 Miller et al. ................ 250/286
7,424,980 B2 9/2008 Ruediger et al.
7,569,811 B2 * 8/2009 Javahery et al. ............. 250/282
2008/0258052 A1 * 10/2008 Jolliffe et al. ............... 250/282

OTHER PUBLICATIONS

PCT International Search Report for International Application No. PCT/CA2009/000120. International Filing Date: Feb. 2, 2009.

* cited by examiner

*Primary Examiner*—Nikita Wells

(57) ABSTRACT

An ion source and method for providing ionized particles to a molecular/atomic analyser, such as a mass spectrometer, are disclosed. The ion source includes a vessel defining a channel; a gas inlet extending from the gas source into the channel, for introducing a gas flow into the channel; a sample inlet extending into the channel for introducing sample within the channel; and an ionizer to ionize the sample in the channel. The vessel is sufficiently sealed to allow the channel to be pressurized, at a pressure in excess of 100 Torr. At least one gas source maintains the pressure of the channel at a pressure in excess of 100 Torr and the pressure exterior to the channel at a pressure in excess of 0.1 Torr and provides a gas flow that sweeps across the ionizer to guide and entrain ions from the ionizer to the outlet.

46 Claims, 9 Drawing Sheets

ION SOURCE VESSEL AND METHODS

FIELD OF THE INVENTION

The present invention relates generally to molecular and atomic analysis and more particularly to ion sources for use with molecular and/or atomic analysis devices, such as mass spectrometers, and related methods.

BACKGROUND OF THE INVENTION

Molecular and atomic analysis, such as mass spectrometry, has proven to be an effective analytical technique for identifying unknown compounds and for determining the precise mass of known compounds. Advantageously, compounds can be detected or analyzed in minute quantities allowing compounds to be identified at very low concentrations in chemically complex mixtures. Not surprisingly, mass spectrometry has found practical application in medicine, pharmacology, food sciences, semi-conductor manufacturing, environmental sciences, security, and many other fields.

A typical molecular analyzer includes an ion source that ionizes particles of interest. In a mass spectrometer, the ions are passed to an analyzer, where they are separated according to their mass (m)-to-charge (z) ratios (m/z). The separated ions are detected at a detector. A signal from the detector may be sent to a computing or similar device where the m/z ratios may be stored together with their relative abundance for presentation in the format of a m/z spectrum. Mass spectrometers are discussed generally in "Electrospray Ionization Mass Spectrometry, Fundamentals, Instrumentation & Applications" edited by Richard B. Cole (1997) ISBN 0-4711456-4-5 and documents referenced therein.

Electrospray ionization is a widely used ionization technique for mass spectrometry, due to its ability to generate large molecular ions with minimal fragmentation. Analyte sample is typically dissolved in a solvent and buffer mixture held at a pH to enhance formation of molecular adducts in solution. Commonly analyte liquid, including analyte sample dissolved in one or more solvents, is delivered through a small capillary tube positioned within a large volume plenum chamber. The plenum chamber houses the capillary tube and an exhaust drain for the liquid flow. Commonly, the mass spectrometer sampling orifice is positioned in the plenum chamber, in close proximity to the capillary tube.

Electrospray ions are generated by a high voltage applied to the capillary tube. An electric field is established between the capillary tube and a surface in close proximity to the sampling orifice of the mass spectrometer—usually the sampling orifice itself. The electric field is very strong at the tip of the capillary and, through the electrospray induces charge separation. As a result the liquid sample is nebulized and an ion plume is established.

For liquid flow rates above 1 uL/min, nebulization of the charged liquid is usually aided by a tube coaxial with the capillary tube and terminating close to the capillary tip, between which flows a high velocity nebulizing gas. Sometimes, an additional heat gas flow is added for desolvation of the liquid droplets at higher liquid flow rates. The resulting mixture of droplets, ions and nebulizing gas flow is sampled by a sampling orifice leading to the inlet of the analyzer.

While this approach provides a convenient way of coupling an electrospray ion source to the sampling orifice of a molecular analyzer/mass spectrometer, it has disadvantages resulting largely from the direct sampling of ions generated by the capillary tube by the sampling inlet of the analyzer, due to the proximate coupling of the capillary tube with the sampling orifice via an open volume plenum chamber.

Further, the optimum ESI signal/noise is dependent upon positioning of capillary tip, as well as the position of the capillary tip relative to the nebulizer tip both radially and axially, the nebulizer flow rate, and heat gas flow rate, which are all functions of sample flow rate, and the analyte itself. As a consequence, ions from the ion source are not efficiently sampled by the mass analyzer, causing reduced sensitivity of the mass spectrometer. Often, additional manual or automatic adjustment of the source position is required, decreasing ease of use an increasing cost and complexity.

Further, desolvation from the ESI source is typically incomplete at the analyzer inlet, since there is insufficient time for energy and heat transfer during time that the charged droplets pass from the tip of the ESI sprayer and into the entrance of the mass spectrometer. This tends to cause an increase in signal fluctuation, reducing the quality of the measurement, and a reduction in the number of analyte ions produced. Thus fewer analyte ions are sampled by the mass spectrometer.

Most ion sources use large volume plenum chambers, but transporting ions efficiently toward the analyzer within the plenum chamber is problematic. The mixing of the liquid and nebulizing gas with the background gas can diffuse the plume of ions outward, away from the sampling orifice, also reducing sensitivity.

As well, because the plenum volume may be largely characterized by stagnated ambient pressure in regions near the sampling orifice of a mass spectrometer, electric fields are often required to deliver these ions to the sampling orifice of the analyzer. The focusing fields are achieved by applying a high voltage (typically about one kV) to a conductive plate or cone at the entrance of the mass spectrometer. However, use of electric fields at atmospheric pressure is inefficient, due to the inability to focus ions at the necessarily high collision rates between background gas and ions. Furthermore, contamination falling on the conductive plate or cone can cause a change in its conductivity, thereby changing the electric field produced by the applied voltage. This reduces both the sensitivity and stability of the mass spectrometer.

Also, because the analyzer sampling inlet is positioned in the plenum chamber, in close proximity to the capillary tube, any contamination produced by the liquid analyte is sampled by the analyzer, producing further contamination of the analyzer. The capillary tube is disadvantageously positioned close to the entrance, resulting in undesirable occasional electric discharge, and further providing even more contamination to enter the mass spectrometer.

These disadvantages are even more problematic for multiple ion sources that operate simultaneously within the same volume. The use of multiple ion sources may increases the number of samples analyzed per unit time (sample throughput) and therefore the information content per unit time.

Other types of ion sources suffer from similar shortcomings. Specifically, atmospheric pressure chemical ionization (APCI) and atmospheric pressure matrix assisted laser desorption ionization (MALDI) also provide issues with contamination and day to day fluctuations in optimization, with simultaneously operating sources even more difficult to use and optimize.

Accordingly, there is a need for an improved ion source that decouples the ion source and analyzer sampling orifice.

SUMMARY OF THE INVENTION

In accordance with one aspect of the present invention, there is provided an ion source. The ion source comprises: at least one gas source, providing gas at a non-ambient pressure; a vessel defining a channel; a gas inlet extending from the gas source into the channel, for introducing a gas flow into the channel; a sample inlet extending into the channel for introducing sample within the channel; an ionizer to ionize the sample in the channel; an outlet extending from the channel into a region defined by a plenum; the vessel sufficiently sealed to allow the channel to be pressurized, at a pressure in excess of 100 Torr; and wherein the at least one gas source maintains the pressure of the channel at a pressure in excess of 100 Torr and the pressure exterior to the channel in the region defined by the plenum at a pressure in excess of 0.1 Torr and provides a gas flow that sweeps across the ionizer to guide and entrain ions from the ionizer to the outlet.

In accordance with another aspect of the present invention, there is provided a method of providing ionized particles to a mass spectrometer. The method comprises: providing a guide channel; introducing ions within the guide channel; establishing a substantially fixed pressure and flow of transport gas in the guide channel, to entrain and guide the ions to exit from the channel to an inlet of the mass spectrometer in a substantially laminarized flow, wherein the flow of transport gas is between 1 and 50 standard liters per minute (SLM).

In accordance with yet another aspect of the present invention, there is provided a method of providing ions. The method comprises: providing a vessel defining a channel the vessel comprising a gas inlet extending into the channel, an ionizer extending into the channel to ionize a sample in the channel; and an outlet extending from the channel to guide ions to an entrance of an analyser; providing ions from the ionizer into the channel; maintaining the pressure of the channel at a pressure in excess of 100 Torr, maintaining the pressure exterior to the channel at the outlet at pressure in excess of 0.1 Torr; introducing a gas flow from a gas source at a non-ambient pressure into the channel to sweep across said ionizer to guide and entrain ions from the ionizer to the outlet.

In accordance with yet another aspect of the present invention, there is provided an analysis device for analyzing molecules or atoms. The analysis device comprises: an ion source, comprising: at least one gas source, providing gas at a non-ambient pressure; a vessel defining a channel; a gas inlet extending from the gas source into the channel, for introducing a gas flow into the channel from the gas source, to maintain the pressure of the channel in excess of 100 Torr; a sample inlet extending into the channel for introducing sample within the channel; an ionizer to ionize the sample in the channel; an outlet extending from the channel; the vessel sufficiently sealed to allow the channel to be pressurized, at a pressure in excess of 100 Torr; an analyser stage for analysing ions from the ion source, the analyser having an inlet in flow communication with the outlet of the ion source; wherein the pressure a region connecting the inlet of the analyser stage to the ion source is at a pressure in excess of 0.1 Torr and wherein the at least one gas source provides a gas flow that sweeps across the ionizer to guide and entrain ions from the ionizer to the outlet.

In accordance with yet another aspect of the present invention, there is provided a method of providing ions. The method comprises: providing a vessel defining a channel the vessel comprising a gas inlet extending into the channel, at least one sample inlet extending into the channel; and an outlet extending from the channel to guide ions to an entrance of an analyser; providing a voltage between the sample inlet into the channel, and the channel to produce electrospray ions; introducing a gas flow from a gas source at a non-ambient pressure into the channel to entrain electrospray ions and guide electrospray ions to the outlet.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
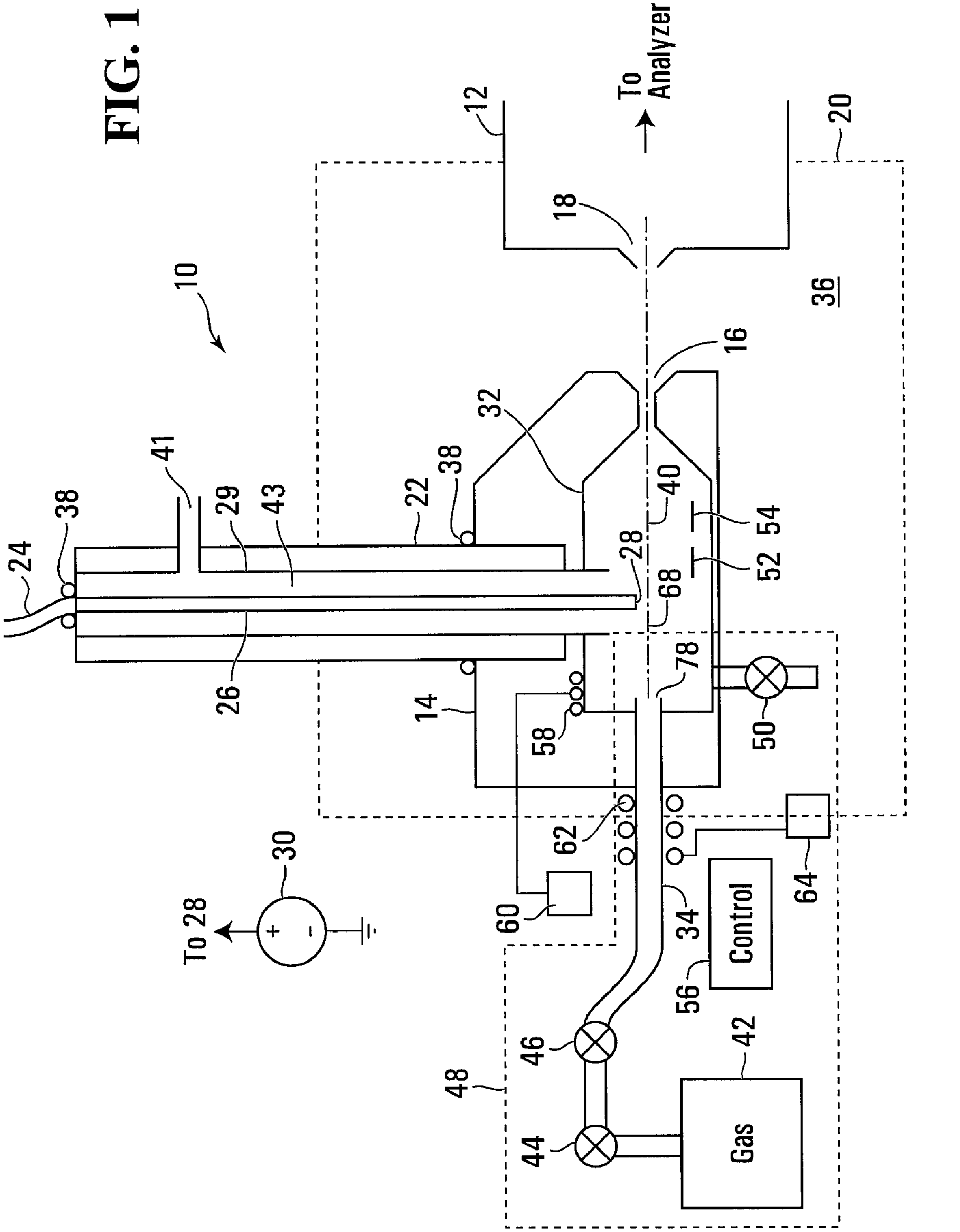
FIG. 1 is a simplified schematic diagram of a molecular analyzer including an ion source and spectrometer, exemplary of an embodiment of the present invention.

FIG. 1 depicts a schematic cross section of ion source 10, suitable for one or multiple sample inlets, exemplary of an embodiment of the present invention. Source 10 may generally form a part of a molecular or atomic analyzer for chromatography, fluorescent, absorption, mass spectral analysis, or the like.

As illustrated, ion source 10 includes a vessel 14 with an outlet 16 in proximity of a sampling orifice 18 of an analyzer; such as for example mass spectrometer 12. Ion source 10 may be positioned within a plenum chamber 20 defined by a plenum of mass spectrometer 12, held generally near atmospheric pressure. Outlet 16 thus provides an outlet into the region between outlet 16 and sampling orifice 18. In the analyzer of FIG. 1, this region is defined by the plenum, but need not be so defined.

In ion source 10 of FIG. 1, an ionizer 22 provides for electrospray ionization of liquid sample. As such, source 10 includes liquid sample inlet 24 that feeds capillary 26, terminating in at least partially conductive electrospray tip 28.

Electrospray tip 28 is electrically insulated from the casing of vessel 14 and the housing of ionizer 22. The inner diameter of capillary 26 may be of any suitable size—for instance between 0.1 mm and 0.5 mm. Vessel 14 is at least partially conductive. A voltage source 30 provides a potential difference between vessel 14 and tip 28, sufficient to produce charge separation of sample solutions provided through capillary 26. Typically, 1000-5000V is applied for positive ions, and −1000 to −5000V is applied for negative ions. The voltage may be applied to tip 28, to vessel 14, or to electrodes in the vicinity of tip 28 (not shown).

Sample inlet 24 feeds a liquid sample at a selected flow rate, between for example around 50 nl/min to more than 1 ml/min. Liquid flow may be controlled by a liquid pump (not shown) upstream of sample inlet 24.

As illustrated in FIG. 1, vessel 14 defines an interior channel 32. An outlet 16 extends from the narrow end of channel 32, from which ions and droplets formed by ionizer 22 may be provided. Outlet 16 may exit into plenum chamber 20, and be located in direct flow communication with, or in proximity to, a sampling orifice 18 of an analyzer, such as for example the analyzer of mass spectrometer 12. The depicted example channel 32 may have a generally cylindrical shape. One or more gas inlets 34 may provide a transport gas into channel 32.

Once ions exit through outlet 16, ions are guided in part by transport gas towards sampling orifice 18 and further guided to the downstream analyzer stage of the mass spectrometer 12.

Although outlet 16 and orifice 18 are depicted as coaxial, sampling orifice 18 may be positioned at an angle relative to outlet 16.

Channel 32 extends along a lengthwise extending axis 40. Electrospray tip 28 extends into channel 32 at an angle of about 90° to axis 40. As will be appreciated, this outlet need not be directed at 90° to axis 40, but could be directed at any angle relative to this axis 40.

Channel 32 within vessel 14 may be sufficiently sealed to reduce gas passage from interior plenum chamber environment (generally at 36) and vessel 14, thereby permitting operation at elevated or reduced pressure relative to the ambient pressure of FIG. 1. Ion source 10 may, for example, be machined out of a single piece of metal, for example stainless steel, with appropriate pressure seals (for example seals 38) to reduce gas passage from ambient and ionizer 22. A sealed liquid feed may provide a sample from inlet 24 to ionizer 22.

Gas source 42, for example, may provide a transport gas by way of inlet 34 to channel 32. The pressure of gas from source 42 to inlet 34 may be regulated by regulator 44. In the depicted embodiment, the transport gas may be dry air, typically free of contamination, that may be provided from a compressed source, such as a regulated tank of feed controlled with fixed or variable size orifices with or without feedback. Other gases known to those of ordinary skill, such as $N_2$, $O_2$, Ar, mixtures further containing reactive gas, such as $NO_2$, or the like, may be used in place of air.

A gas delivery system 48 may provide a defined pressure differential between the interior of inlet 34, interior of channel 32, outlet 16 and the ambient pressure exterior to channel 32, for example generally at 36 within plenum chamber 20, providing a desired gas flow rate. For example gas delivery system 48 may take the form of one or more gas sources, such as pressurized gas source 42, an inlet 34, and optionally regulator 44, restrictor or valve 46, and one or more relief valves 50 into channel 32. Pressure in channel 32 may be adjusted by adjusting the flow rate into channel 32 and any pressure relief to channel 32, including relief valves 50 and outlet 16.

More specifically, a pressure P1 may, for example, be obtained in channel 32 when a gas flowing into channel 32 at a flow rate of Q is released to an ambient environment at 36 held at a pressure P2 determined by the total conductance C of relief valves 50 and outlet 16, whereby Q=(P1-P2)C.

Pressure relief valve(s) 50 may further allow the pressure within channel 32 to be relieved, and thus reduced. Conveniently, as valve 50 is opened, the pressure within channel 32 may be reduced while the flow rate through inlet 34 can remain constant.

Delivery system 48 may also optionally include one or more pressure sensors 52, and flow rate sensors 54, and further include a controller 56, to monitor and select a flow rate and pressure, and may optionally provide feedback control whereby a defined flow rate and pressure may be maintained precisely in closed loop fashion. Gas delivery system 48 may further be controllable so that the pressure or flow rate in channel 32 changes in time, to enhance the performance for different sample compositions or flow rates.

In the depicted embodiment, gas delivery system 48 maintains the pressure in channel 32 in excess of 100 Torr and the pressure exterior to channel 32 at outlet 16 in the region between outlet 16 and sampling orifice 18 is at a pressure in excess of 0.1 Torr.

The interior of channel 32 may optionally be heated through vessel 14 by a heat source 58, controlled by controller 60, to set temperatures above ambient, for example from 30-500 C, in order to aid in energy transfer to the electrospray droplets in a mixing region 68, and to aid in evaporation of the liquid from sample inlet 24. Similarly transport gas from gas source 42 may optionally be heated by a second heat source 62 controlled by controller 64 prior to entering channel 32. Each heat source 58, 62 may include cartridge heaters, ceramic heaters, resistive coils, and the like.

The flow rate of transport gas at exit 78 of inlet 34, resulting from gas delivery system 48, may be about 1-50 standard liter per minute (SLM). Such flow rates may generate turbulization and velocity near exit 78, and to provide a gas flow toward outlet 16. The gas flow rate may be selected to vary, optionally by computer control, depending on various conditions, including the liquid flow rate through sample inlet 24, the operating pressure within channel 32, and the sample composition, to increase sensitivity of the mass spectrometer.

More specifically gas inlet 34 may be a small diameter tube, having for example 1 to 3 mm diameter, and having a length of 1 mm, or more. This inlet arrangement may produce a pipe flow that may produce a high velocity flow that may be turbulent at exit 78 of the tube feeding inlet 34 into channel 32. Exemplary channel 32 in FIG. 1 may be generally cylindrical with a diameter in the range of 5-30 mm diameter.

Conveniently, vessel 14 may be shaped or tapered to smoothly transfer gas through the channel to outlet 16, reducing or even minimizing dead volume, stagnation or additional turbulence production near corners.

In the exemplary embodiment of FIG. 1, gas flow is turbulized where inlet 34 enters channel 32, due to sudden expansion of the gas jet from inlet 34 at exit 78.

The length of channel 32 can be selected to allow for the gas flow to become at least partially laminarized. Typically, length of channel 32 can be greater than 3 or 5 or 10 times the non-tapered portion of diameter of channel 32, about 3-10× the diameter, for example of the order of 15-100 mm or more.

In particular channel 32 diameter can be selected to generally maintain a Reynolds number below 2300 near outlet 16 producing generally laminarized flow. As is well known, Reynolds number can be characterized by gas flow rate, dynamic viscosity and channel diameter. For example, a Reynolds number may be estimated using $$Re = \frac{4}{\pi}\frac{G}{\mu D},$$

where G is mass flux, D is the channel diameter, and $\mu$ is the coefficient of dynamic viscosity for air.

For example, at atmospheric pressure and 300K, with channel 32 of 5 mm diameter with a 5 SLM flow rate of air yields a Reynolds number in channel 32 downstream of mixing region 68, of about 1400; for 20 SLM and with channel 32 diameter of 15 mm of about 1900; and for 50 SLM with channel 32 diameter of 30 mm of about 2380.

However, as will be appreciated, the geometry of channel 32 is varied the Reynolds number will vary. In particular, the Reynolds number is difficult to estimate for complicated geometries that are also within the scope of this invention, and as such it is only provided for illustration purposes.

Although vessel 14 in FIG. 1 includes a smoothly tapering channel 32, it will be appreciated that it may be a smoothly or sequentially increasing channel diameter, to further turbulize or laminarize the gas. For example, for a 20 SLM gas flow, mixing region 68 or turbulence may be extended using a 5 mm diameter channel, the Reynolds number increasing to about 5500; followed by a 15 mm laminarizing channel, with a Reynolds number decreasing to 1900, followed by a 30 mm laminarizing channel, with Reynolds number decreasing to about 950.

Overall, ion source 10 with vessel 14 provides a gas throughput, pressure and channel 32 geometry that yields substantial net flow toward the sampling orifice 18. This is in contrast to conventional ion sources within a conventional plenum chamber, which may produce substantial stagnation and little net flow toward the sampling orifice.

In operation, sample containing particles to be ionized, is introduced to sample inlet 24 (FIG. 1), in liquid form. Ion source 10 provides ions from a sample through outlet 16 to sample orifice 18 of spectrometer 12, such that analyte ions in the sample may be measured. High voltage is applied to vessel 14 or electrospray tip 28 or to electrodes in the vicinity of tip 28 (not shown).

The electric field at tip 28 of ion source 10 in the presence of an applied voltage to vessel 14 forms an electrospray of ionized particles. The spray is introduced from ionizer 22 into channel 32. Vessel 14 is optionally heated to aid in desolvation of the spray.

Gas is provided at gas inlet 34 from a gas source 42, at a pressure in excess of the pressure within channel 32 and outlet 16. The gas may optionally be heated. Gas delivery system 48 may control pressure and flow in channel 32. Specifically, controller 56 may control regulator 44, valves 46, 50 to produce flow rates on the order of 1-50 SLM, and channel 32 is maintained at a pressure that is improved or optimized for a particular molecular sample.

In the embodiment of FIG. 1 pressure within channel 32 may be varied from about 760 Torr to over 2000 Torr. For example, such a pressure range may be desirable to increase or optimize ion signal, depending on particular characteristics of the molecular ions, such as size, polarizability, polarity, and fragility.

Channel 32 constrains the flow of gas from gas inlet 34 to outlet 16 so as to allow gas to sweep past ionizer 22 and entrain the ESI spray from ionizer 22 to transport the ions to outlet 16 by the flow of gas introduced at gas inlet 34, produced by the pressure gradient between inlet 34 and outlet 16.

Conveniently, an increase in the diameter of channel 32 relative to diameter of inlet 34 may create a turbulization of the flow in channel 32 producing a volume of mixing in mixing region 68. Mixing region 68 may be therefore characterized by turbulent or near turbulent gas flow. Conveniently, a plume of ions from ionizer 22 produced near tip 28 are introduced into mixing region 68 providing energy transfer. The energy transfer may serve to disrupt and disperse the plume of ions, reducing the relationship between the position of the tip and the sampled ion intensity, and to aid in desolvation and analyte ion generation. Transport through channel 32 may then conveniently allow a reduction in turbulization of the transport gas downstream of mixing region 68 and an increase in laminarization proximate outlet 16 aiding in the ion extraction and transport through outlet 16. The ions within the generally laminarized flow near outlet 16 are directed to the mass spectrometer in large part by the flow from inlet 34 to outlet 16.

Voltages may be applied to vessel 14 and additional electrodes (not shown) downstream of vessel 14 to aid in extraction of ions as they exit outlet 16 and are directed toward the orifice 18 of the mass spectrometer 12. Additionally shrouds (not shown) may be provided to shield exiting ions from repulsive voltages. Voltages may also be applied to the mass spectrometer sampling orifice 18 to further draw ions into the mass spectrometer.

Conveniently, then, the ion source intensity may be independent of position or sample or gas flow; sample can be provided sufficient time for desolvation; ions can be transported by gas flow rather than primarily electric fields; and contamination may not directly enter the mass spectrometer 12; thereby resulting in improved sensitivity and reduced signal fluctuation, increased ease of use, lower cost and less frequent down time. As will become apparent, multiple ionizers, like ionizer 22 can also be readily incorporated into ion source 10.

Mixing region 68 may be created in numerous other ways. For example a turbulizing grid positioned downstream of inlet 34 or multiple streams of gas could be introduced into channel 32 from different directions. These, in combination with suitable channel geometry, may create sufficient turbulence to allow mixing of ions and transport of ionized particles as described. Optionally capillary 26 may be inserted in one or more tubes 29, concentrically arranged, as shown in FIG. 1. Auxiliary gas may be supplied coaxial to capillary 26 and tip 28 by way of inlet 41 and annular channel 43, for example to aid in nebulization or drying of the liquid sample. As will be appreciated, multiple feeds (two or more) of gas may be supplied to aid in nebulization or drying at or near tip 28. As such, multiple feed channels to tip 28 may be provided. The feed channels may or may not be coaxial. They may alternatively be arranged in parallel, or converge at or near tip 28. Each feed channel may be supplied with a different gas or the same gas at different temperature and/or pressure.

As will now be appreciated, transport gas also may be provided coaxial to capillary 26 and tip 28 using gas source 42 and flow and gas delivery system 48, by way of inlet 41 and annular channel 43, singularly or in combination with gas inlet 34, and optionally in combination with nebulizing gas. Gas may optionally be heated. Gas flow at the outlet near tip 28 may therefore provide mixing and turbulization.

A counter flow of clean gas (not shown) may also be supplied, flowing away from orifice 18 that may assist in preventing large droplets from entering orifice 18.

Figure 2:
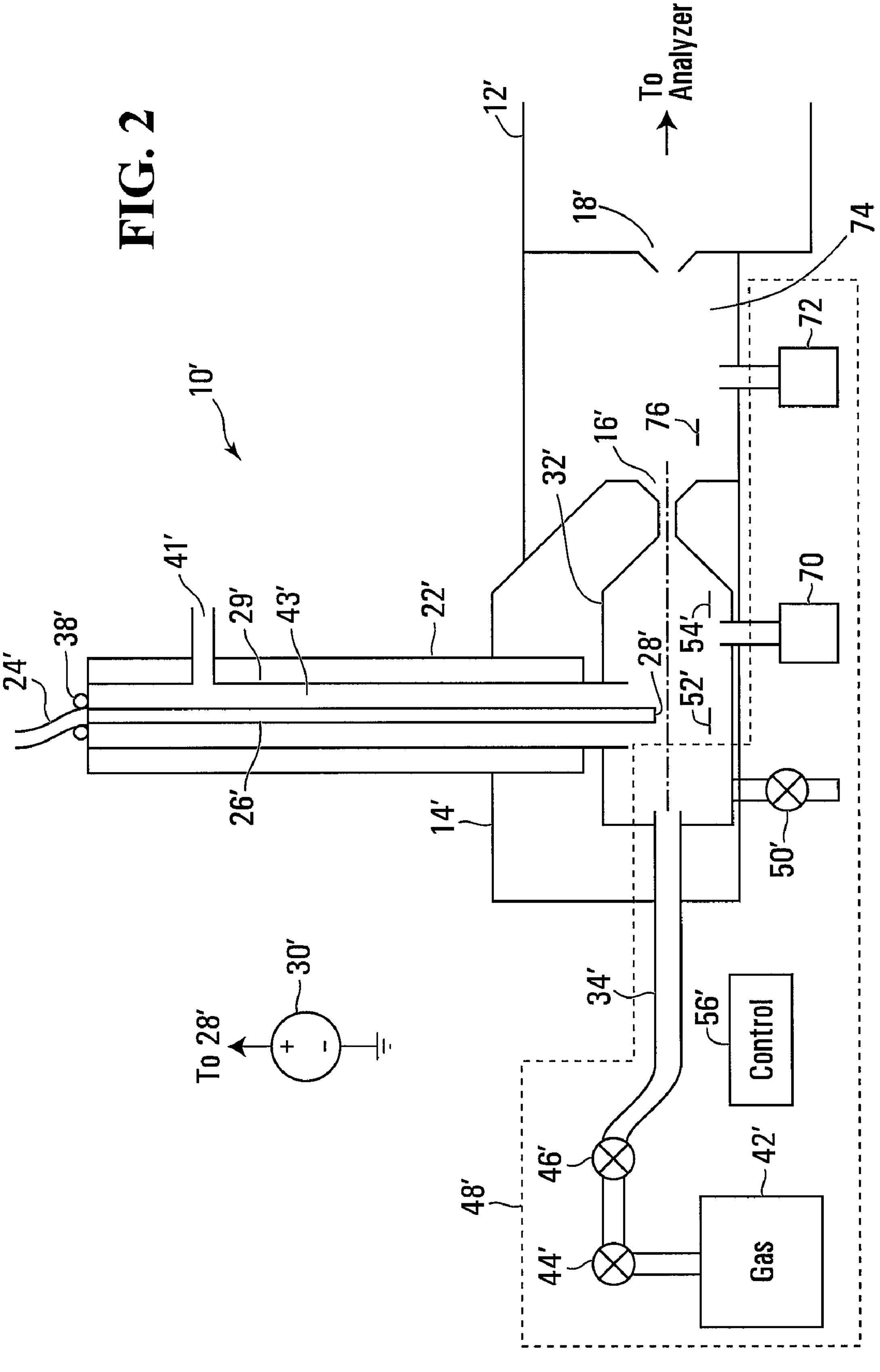
FIG. 2 is a simplified schematic diagram of an ion source and mass spectrometer, exemplary of another embodiment of the present invention.

Optionally the pressure within channel 32 of vessel 14 also may be varied below 760 Torr, for example from 100 Torr, for example by computer control, to further optimize the ion signal for different molecular ions. To this end, gas delivery system 48 may alternatively include one or more vacuum pumps to evacuate channel 32. An alternate ion source 10' in which pressures can be maintained below atmosphere, exemplary of another embodiment of the present invention, is depicted in FIG. 2. Elements of ion source 10' identical to those in ion source 10 have the same numeral with a (') symbol. As illustrated, ion source 10' includes gas delivery system 48' that may include a gas source 42', regulator 44', valve 46' and valve 50' and controller 56' (as gas source 42, regulator 44, valves 46, 50 and controller 56, described above). Delivery system 48' may further include one or more pumps 70, 72 in communication with channel 32', and outlet 16' of ion source 10'. Operating speeds of pumps 70 and 72 may be varied, again by computer control, by for example controller 56' controlling a variable conductance limiting orifice (not shown), by controlling the mechanical frequency of the pumps 70, 72, or in other ways understood by those of ordinary skill. Sensors 52' and 54' may measure pressure and flow in channel 32'. rate C (for example in I/s)

Using pumps 70 and 72, channel 32' may be evacuated to pressure below 1 atmosphere, between 1 Torr and atmosphere, for example at 100 Torr. Channel 32' may be geometrically arranged to guide ions in a flow to sampler orifice 18', or to downstream ion guides (not shown) that in turn guide ions into sampling orifice 18' of a mass spectrometer 12'.

Pump 72 may further evacuate a secondary chamber 74 connecting outlet 16' of channel 32' and orifice 18' of mass spectrometer 12'. A further sensor 76 may provide the pressure of this chamber to controller 56'. Chamber 74 is maintained at a pressure below channel 32 to provide a general direction of gas flow toward the mass spectrometer orifice 12'. Chamber 74 may be large diameter or may have a smaller diameter, on the order of the diameter of channel 32', to preserve a generally laminar flow toward orifice 18'. Electrodes with attractive voltages (not shown) may further be used to aid in guiding the ions toward orifice 18'. For example, a multipole ion guide (not shown) with alternating RF voltage and attractive DC voltage may be positioned between outlet 16' and orifice 18' to guide ions into analyzer 12'.

Again a controller in the form of a controller 56', computing device, industrial controller, or the like, similar to controller 56 may be used maintain pressures and flow rates within channel 32' under software control.

Again, the gas flow rate through inlet 34', temperature and pressure may be adjusted for improved ion signal in mass spectrometer 12'.

As well, in ion sources 10/10' outlet 16/16' are in direct flow communication with sampling orifice 18/18'. However, it will be appreciated that other combinations of pressures may be useful. For example channel 32/32' may be held above atmosphere but may be in direct communication with a downstream channel, below atmosphere.

As will now be appreciated, ionizer 22 need not be an electrospray ionizer, but could be another type of ionizer known to those of ordinary skill. For example, ionizer 22 could be replaced with an atmospheric pressure chemical ion (APCI) corona ionizer, a (MALDI) ionizer; atmospheric pressure photionization (APPI) ionizer, chemical ionisation (CI) ionizer; electron impact (EI); Nickel B emitter; field desorption/field ionisation (FD/FI); or thermospray ionization (TSP) ionizer.

Figure 3:
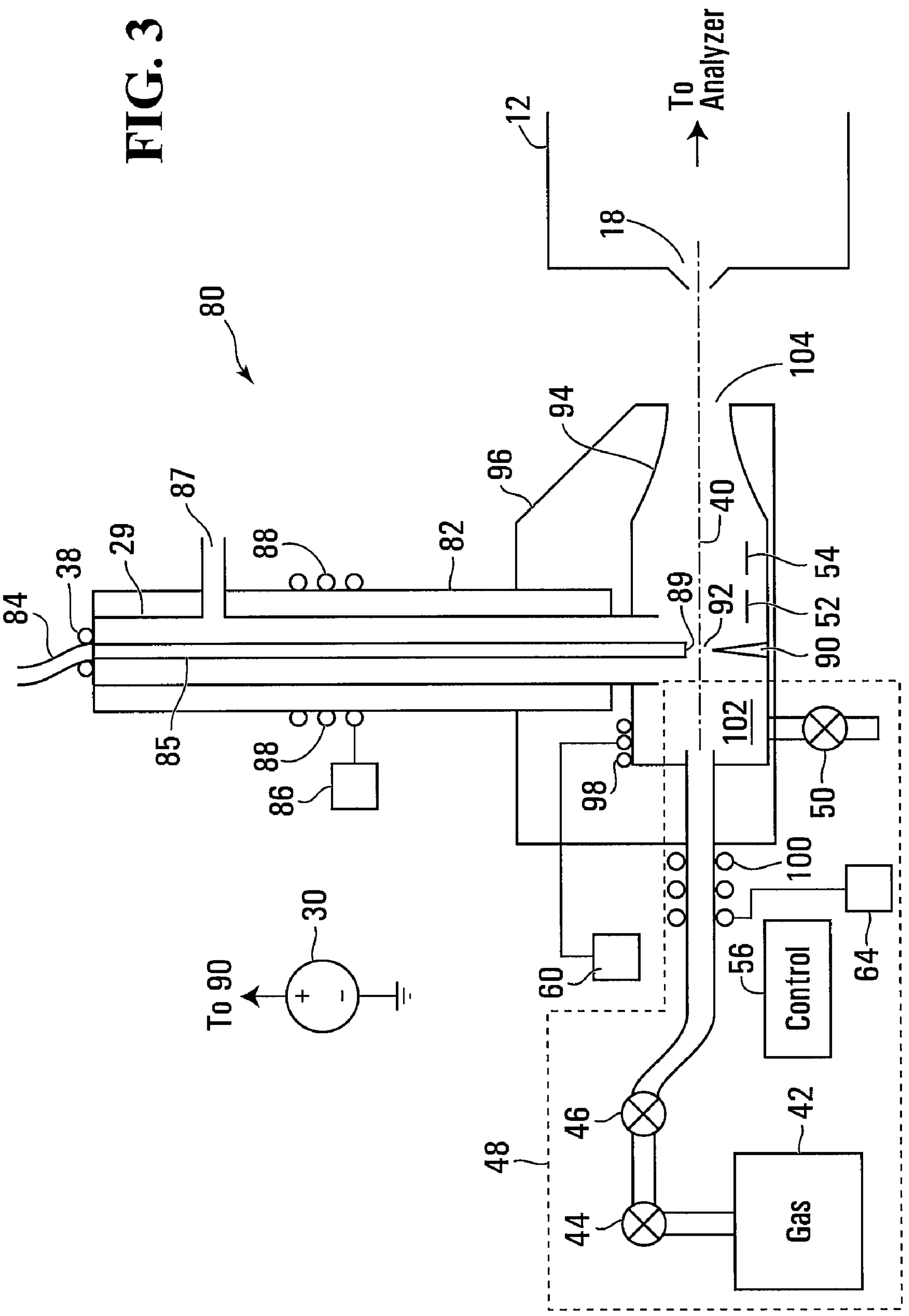
FIG. 3 is a simplified schematic diagram of an ion source and mass spectrometer, exemplary of a further embodiment of the present invention.

For example, a single ion source 80 incorporating an atmospheric pressure chemical ionization ionizer (APCI) is shown in FIG. 3. As illustrated, ionizer 22 (FIG. 1) may be replaced with vaporizer 82 to vaporize liquid sample from an inlet 84. Optional additional electrospray ion sources (not shown) may further form part of ion source 80. A liquid sample may be let into sample inlet 84 to capillary 85 and sample may be volatilized as it travels the length of the tube, exiting at outlet 89. The inner diameter of capillary 85 may be again of any suitable size—for instance between 0.1 mm and 0.5 mm. Heat source 88, providing heat for volatilization, is controlled by a controller 86 to temperatures above ambient, for example to 50-500 C. Additional gas may be provided through inlet 87 and an annular region in vaporizer 82 to aid in vaporization and aerosol formation to produce an aerosol of vaporized liquid sample near region 92. For example, heat source 88 may be applied directly to vaporizer 82. Again, heat source 88 may take the form of cartridge heaters, ceramic heaters, heating coils or the like.

Conductive corona needle 90, electrically isolated from vessel 96, is positioned generally at region 92 near outlet 89 of in channel 94 of vessel 96. Needle 90 is supplied high voltage capable of supplying current to sustain a corona discharge.

Alternatively or simultaneously, the interior of channel 94 may again optionally be heated through vessel 96 by a heat source 98 to temperatures above ambient, for example from 30-500 C, in order to aid in evaporation of the liquid from sample inlet 84. Furthermore, transport gas from gas source 42 may optionally be heated by heat source 100 prior to entering channel 94 to similarly high temperatures, to further aid in desolvation of the liquid sample. Also, as in the previous embodiments, transport gas may be introduced coaxially.

A high voltage applied to needle 90 produces a corona discharge in region 92 that generates charged atoms and molecules that further interact with sample molecules via chemical reactions to generate analyte ions. Needle 90 need not be positioned directly across from outlet 89 as shown but may be positioned upstream or downstream, so as to allow sufficient time for the volatilized compounds to react. Ion formation may be enhanced in the region of mixing 102, and again the flow can be generally laminarized near outlet 104.

As will be appreciated, then, the various embodiments may include APCI ionizers like vaporizer 82 and corona needle 90 as well as multiple electrospray ionizers (such as ionizer 22).

Figure 4:
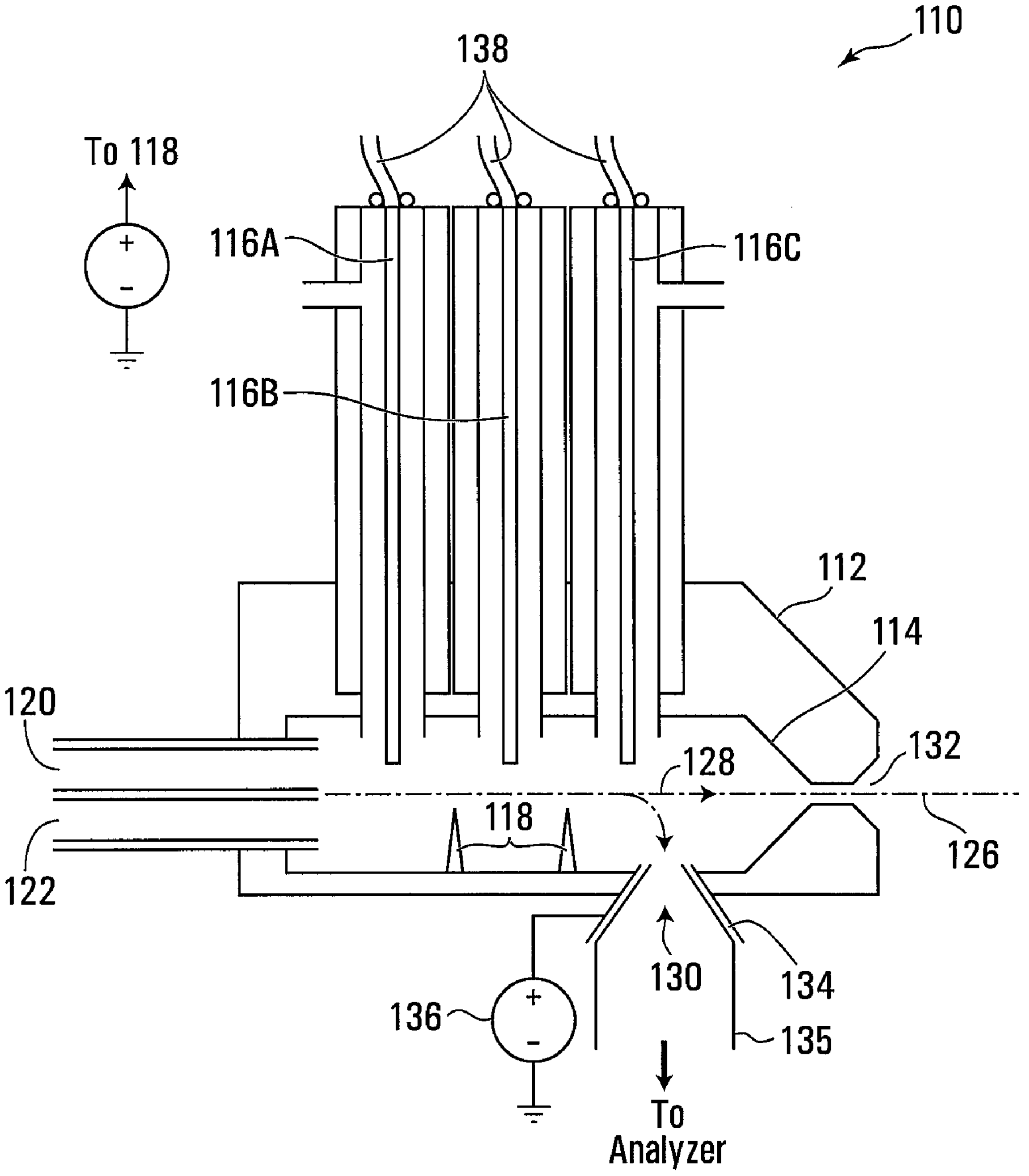
FIG. 4 is a simplified schematic diagram of an ion source, exemplary of a further embodiment of the present invention.

As should also be apparent, a variety of other geometries for an ion source, similarly provide transport within source vessel by way of a transport gas from an ionizer to a mass spectrometer. For example, FIG. 4 depicts an ion source 110, exemplary of another embodiment of the present invention. As illustrated, ion source 110 also includes a vessel 112 defining an interior channel 114. Vessel 112 may be formed of a conductive material, such as metal, or the like.

Multiple ionizers 116*a*, 116*b* and 116*c* (like ionizer 22) provide ions to channel 114, shown side by side, each with sample inlets 138, along with one or more corona needle 118 for APCI. Of course there may be more ionizers, as they may be readily miniaturized, or there may be as few as one ionizer.

Again one or more gas inlets are used to introduce transport gas into channel 114. Here two gas inlets 120, 122 allow for introduction of one or more transport gases into channel 114 generally parallel to a lengthwise extending axis 126. Again, heat sources may be applied to aid in ion formation, and ions experience regions of mixing and laminarization within channel 114.

Again, channel 114 diameter optionally may vary sequentially or smoothly along axis 126. For example diameter at 128 may be increased, to further laminarize the gas flow and reduce gas velocity near sampling orifice 130.

In ion source 110, sampling orifice 130 extending from channel 114 may be located in direct flow communication with, or in proximity to an analyzer, for example a mass spectrometer 135 and may provide ions formed by ion generator 124 to mass spectrometer 135 for analysis.

As shown, sampling orifice 130 extends at a right angle to the flow of gas from inlets 120, 122 to gas outlets 132 (i.e. orifice 130 lies in a plane parallel to axis 126). To further guide ions from channel 114, one or more conductive electrodes, such as shroud 134 may aid in attracting ions toward sampling orifice 130. As well, one or more electrodes (not shown) may optionally be positioned within channel 114 to repel ions toward orifice 130. A shroud 134 may be formed of a conductive material and may be isolated from vessel 112. One or more voltages may be applied by source 136 to shroud 134 (other electrodes, not shown) to attract ions from channel 114 into orifice 130. Once ions exit orifice 130, ions are guided to the downstream analyzer stage of the mass spectrometer 135 of which source 110 may form a part, for mass spectral analysis.

Gas outlet 132 extends from channel 114 and may serve as an exhaust for vessel 112. Therefore ions may be steered into sampling orifice 130 while some or most of the gas flow may exit via outlet 132 along axis 126.

Alternatively ions may be sampled by a sampler in indirect communication with channel 114 and a voltage may be used to help guide ions from channel 114 to the sampler.

As will now be appreciated, axis 126 of channel 114 need not be parallel with the plane of the sampling orifice 130. A person of ordinary skill will readily appreciate that numerous channel geometries are possible. For example, channel 114 could include multiple bends, curves, a non-uniform cross section, or the like.

Figure 5:
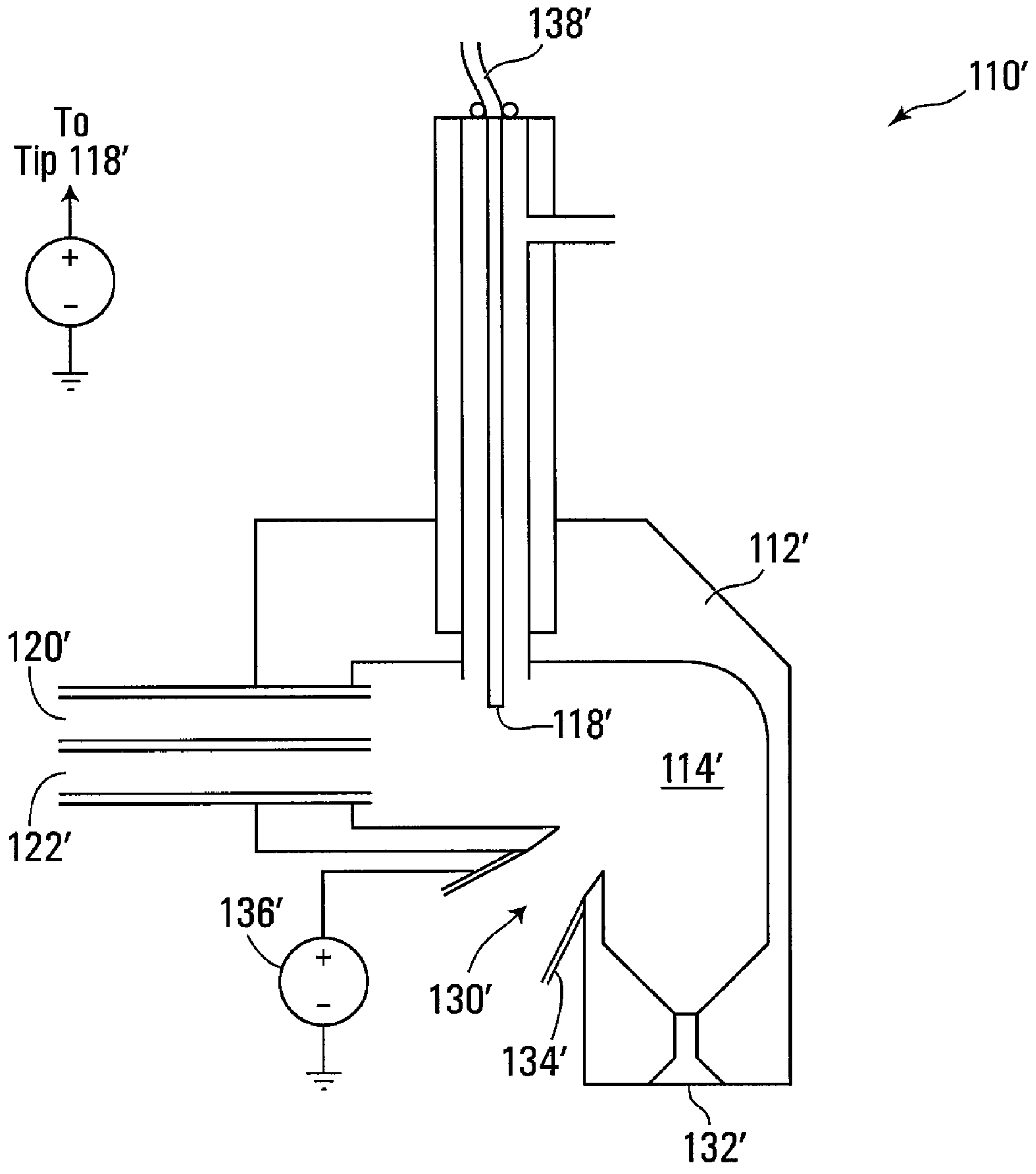
FIG. 5 is a simplified schematic diagram of an ion source, exemplary of a further embodiment of the present invention.

FIG. 5, for example, shows an alternate ion source 110', in which a channel 114' includes a near 90° bend. A sampling orifice 130' is formed, generally orthogonal to the channel, near this bend. Gas inlets 120' and 122' and sampling inlets 138', are otherwise the same as those depicted in ion source 110 (—i.e. inlets 120, 122, 138 of FIG. 4) and will therefore not be further described. Again, transport of ESI gases in ion source 110' is accomplished primarily by a flow of secondary gas along channel 114'.

Again, in the above embodiments, one or more than one sample inlet may be provided.

As will be appreciated a large number of sample inlets are possible, determining the size and construction of sample inlet 24/24'/84/138/138' and the size of vessel 14/14'/96/112/112'. Thus, size and shape of channel 32/32'/94/114/114' may be selected to accommodate a large number of sample inlets. A larger number of sample inlets may require a larger surface area of the vessel. Multiple gas inlets may be supplied to provide the desired gas flow rate to produce ions at the outlet of the channel, and also to further provide regions of mixing and next regions of laminarization where the flow can be laminarized.

For example, ion source 10 may have one ionizer 22 with one corresponding ion sample inlet extending into vessel 14. Alternatively, ion source 10 could be modified to include two, three, ten or even more ion sources, corresponding sample inlets, and one or more gas inlets. Each inlet could provide a different sample type to an associated ionizer. Further, shape of the vessel 14 and channel 32 may be varied, to for example, have a generally round or rectangular cross-section, with a single channel or multiple channels.

Figure 6A:
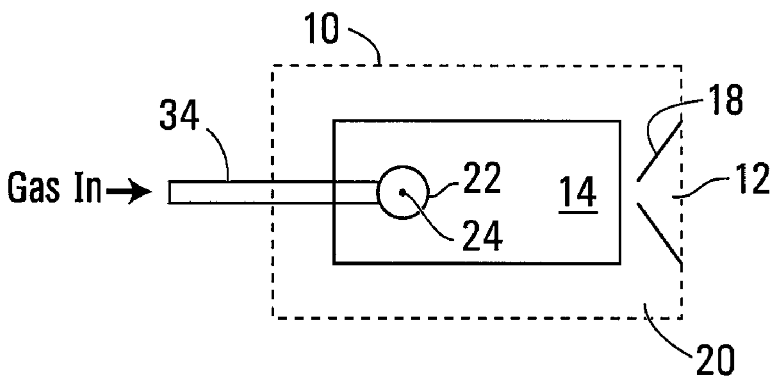
FIG. 6A-6C are schematic top views of ion sources suitable for 1, 2 or 3 sample and transport gas inlets, exemplary of embodiments of the present invention.
Figure 6B:
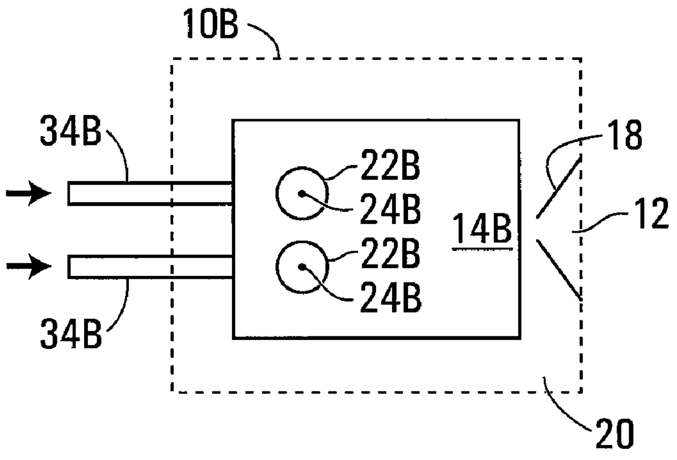
Figure 6C:
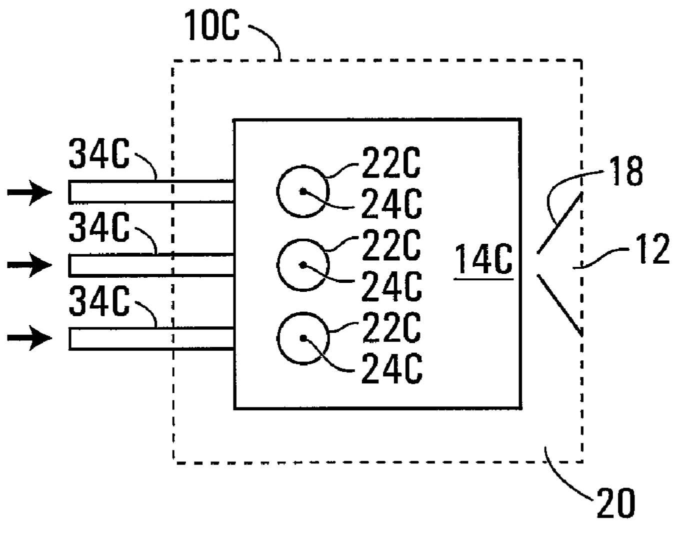

For illustration purposes, FIG. 6A is a top schematic view of the ion source 10 of FIG. 1., FIGS. 6B-6C are top views of alternate ion sources 10*b* and 10*c*, shown with one, two and three vessels 14*b*, 14*c*, ionizers 22*b* and 22*c* (like ionizer 22), sample inlets 24*b*, 24*c* (like sample inlet 24), with gas inlets 34*b* and 34*c* (like gas inlet 34), respectively. Source 10*b*, 10*c* with multiple sample inlets 24*b*, 24*c* of FIGS. 6B and 6C may feed a corresponding number of capillaries (not shown), terminating in a corresponding number of electrospray tips (not shown), that feed a common channel. Although corresponding number of gas inlets to sample inlets are shown in FIGS. 6B and 6C, there may be fewer or more gas inlets than sample inlets.

Figure 7A:
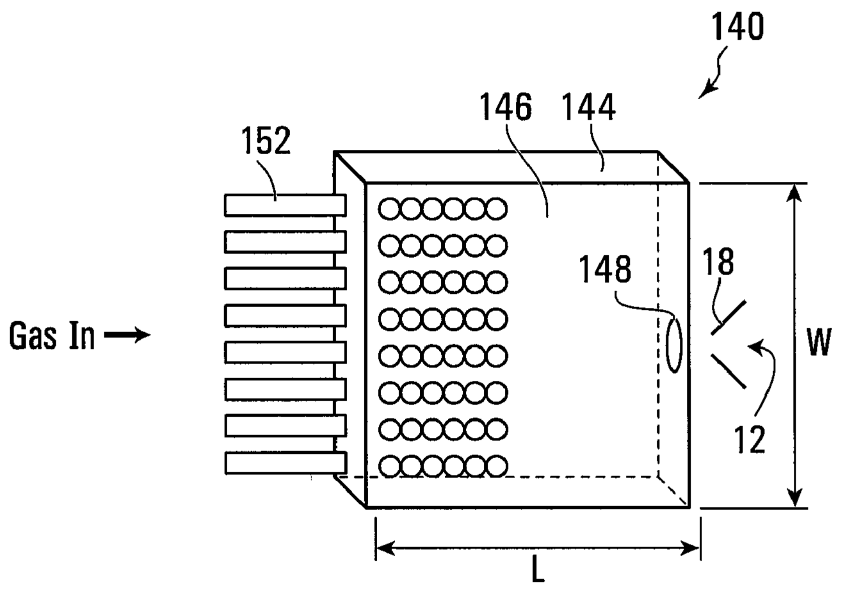
FIGS. 7A-7C are simplified schematic diagrams of ion sources, exemplary of further embodiments of the present invention.

FIG. 7A is a top view of an exemplary ion source 140, shown with an arbitrary number forty-eight sample inlets 142 inserted into a rectangular vessel 144 containing channel 146. In this embodiment eight multiple gas inlets are inserted into vessel 144, although more or fewer are possible. For example in FIG. 7A channel 146 of vessel 144 may consist of a substantially rectangular volume. Channel 146 may be shaped and lengthened to enable gas to flow smoothly toward the exit. The ratio L/W, of channel 146 may be adjusted to provide laminarization near the exit, typically the ratio L/W may be on the order of 3-10.

Conveniently, ions from ion source 140 are produced at forty-eight various positions within vessel 144 characterized by generally turbulized flow and swept through channel 146 through a flow at the outlet 148. Again, outlet 148 may be located in direct flow communication with, or in proximity to, a sampling orifice 18 of an analyzer, such as for example mass spectrometer 12.

Thus ion source 140 generates ions at forty-eight positions along channel 146 of vessel 144 and a single stream of gas that is rich with ions at the outlet 148, giving high efficiency ion transfer, with few of the disadvantages of a conventional multiple ion source and mass spectrometer configurations.

Again, for electrospray, a HV of +/−1000-5000V may be applied to the sprayer tip, or alternatively, to vessel 144, or other electrodes (not shown).

Vessel 144 may further include one or more corona discharge needles (not shown) and other appropriate heat sources (not shown).

Figure 7B:
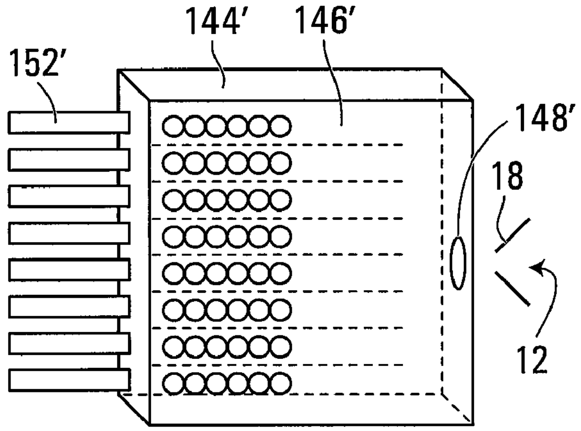

Alternatively, as illustrated in FIG. 7B, vessel 144' may include multiple channels 146', each fed with its own gas inlet 152'. Channel diameters may again be on the order of several millimeters and lengths on the order of several centimeters. For ease of use, a single gas outlet 104 may provide gas to mass spectrometer orifice 18, as in FIG. 7B.

Figure 7C:
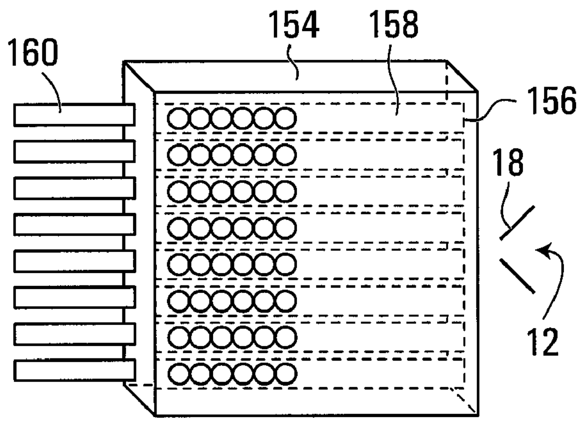

However, as illustrated in FIG. 7C, a vessel 154 may include multiple outlets 156 from multiple channels 158 (with multiple gas inlets 160), isolated from each other. These channels may provide improved transport of ions generated from multiple ionizers.

Furthermore, the embodiments of FIGS. 7B and 7C may be constructed with more or fewer gas inlets 152' and 160, since the inlets do not need to line up with the multiple sample inlets, as long as the construction provides for gas flow from the inlets into the respective channels.

Figure 8:
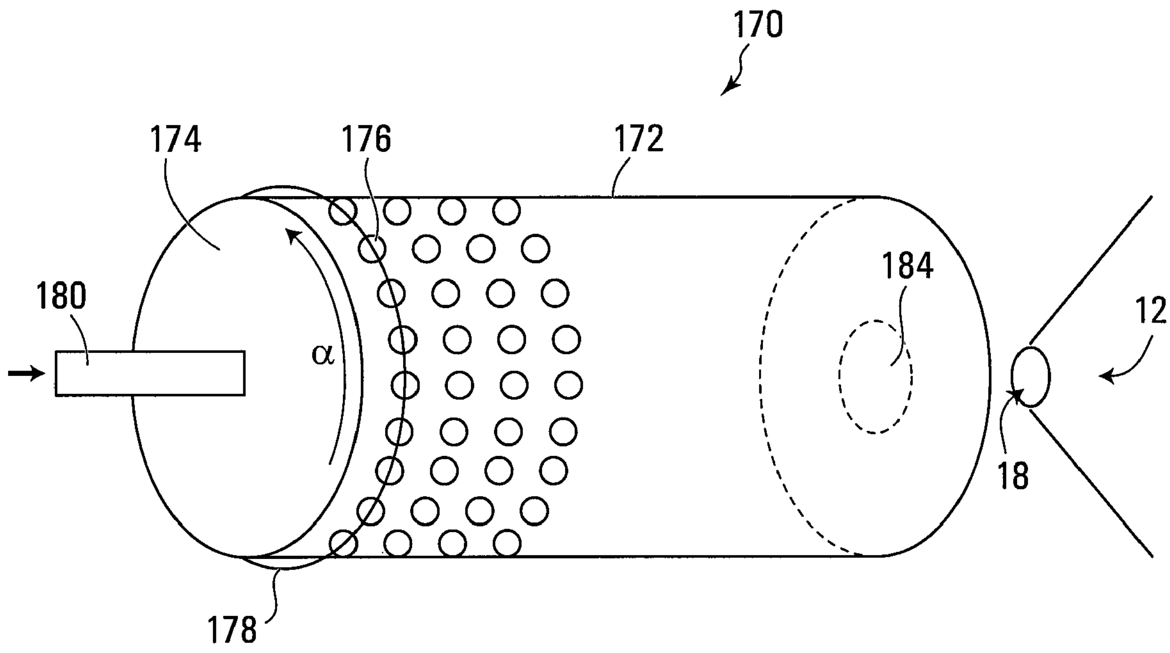
FIG. 8 is a simplified schematic diagram of an ion source, exemplary of a further embodiment of the present invention.

A further embodiment including multiple ionizers is illustrated in FIG. 8. As illustrated, ion source 170 includes vessel 172 of a cylindrical tube with channel 174 of 5-30 mm diameter, for example, suitable for tens or hundreds of sprayers. For example, cylindrical vessel 172 may include twenty sample inlets 176 of about 1 mm diameter spaced about 2 mm center to center on a circumference 178, so that the sprayers are uniformly positioned, requiring a tube diameter of about 10 mm. One or multiple gas inlets 180 may supply high gas flow to channel 174 in the same way as gas inlets 34/34'/120/152 provide gas flows to channel 32/32'/194 of vessels 14/14'/96.

Again, conveniently, ions from ion source 170 may be produced at multiple positions within vessel 172 and swept through channel 174 through a generally laminarized flow at the outlet 184. Again, outlet 184 may be located in direct flow communication with, or in proximity to, a sampling orifice 18 of an analyzer, such as for example mass spectrometer 12. Again, the geometry near outlet 184 may be shaped to generate smooth flow toward outlet 184. The length to diameter ratio of channel 174 may also be adjusted to provide laminarization near outlet 184.

Figure 9:
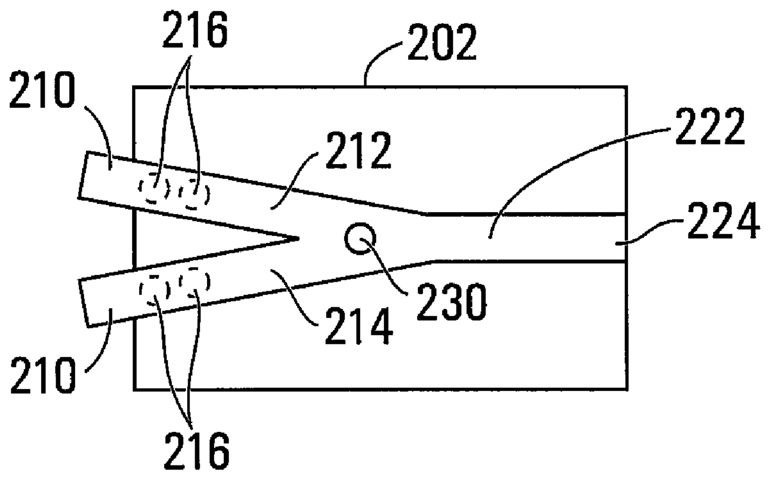
FIG. 9 is a simplified view of an ion source, exemplary of a further embodiment of the present invention.

It will be appreciated that many alternative approaches may be used to provide multiple channels and multiple inlets. For example, FIG. 9 depicts a vessel 202 exemplary of an embodiment of the present invention, with two channels 212, 214 each with two sample inlets and ion sources 216 merging with third channel 222 having an outlet 224. Gas inlets 210 provide transport gas to the channels. Exit 230 may provide ions to a sampling orifice (not shown), in a manner similar to the example of FIG. 4. Channel 212 in combination with outlet 224 (or alternatively a relief valve) provides a pathway for exhaust gas while ions may be sampled through exit 230 in an analyzer (not shown). Additionally, a sampling orifice (not shown) may be positioned at exit near 224.

Figure 10:
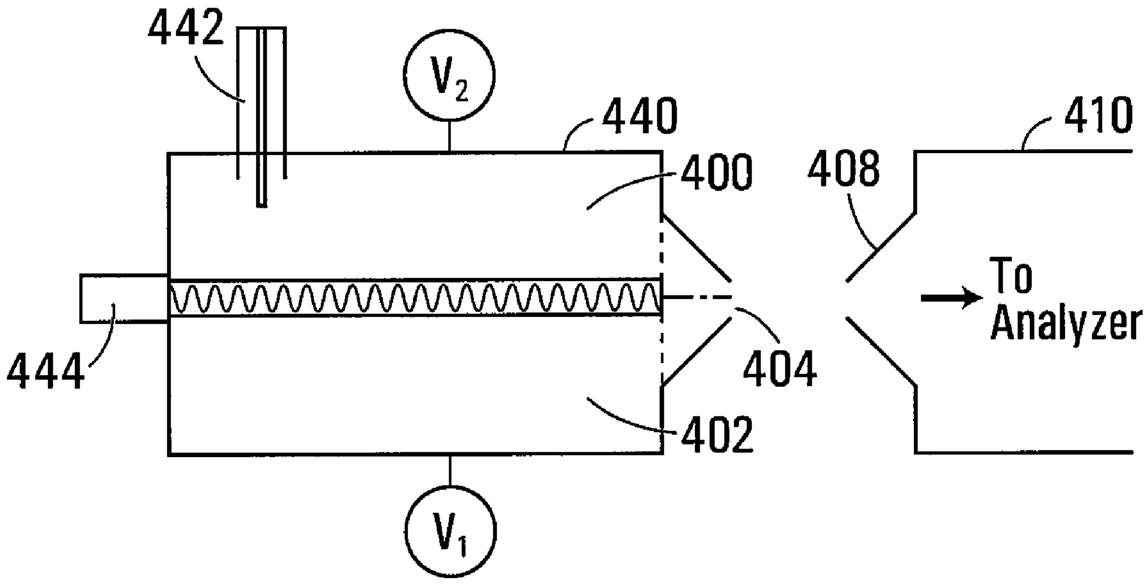
FIG. 10 is a simplified view of an ion source, exemplary of yet another embodiment of the present invention.

Both DC and RF voltages may be applied to one or all sections of the ion source vessel in exemplary embodiments of the present invention. Accordingly, FIG. 10 depicts ion source vessel 440 with ion source 442 and transport gas inlet 444. A first section 400 can be electrically isolated from a second section 402, for example using a ceramic gasket to separate the sections. Here RF voltage (for example 10-500V may be applied to 400 and RF voltage of opposite phase (for example −10 to −500V) may be applied to section 402. In this way ions may be prevented from diffusing to the walls or aided in guiding out the exit 404 into sampling orifice 408 of analyzer 410. Alternatively, section 400 may be grounded, and section 402 may be held at high voltage to produce electrospray. An alternating RF voltage may further be superimposed.

Alternatively, a combination of DC and RF voltages may be superimposed asymmetrically, to provide compensating voltages for the ion drift velocity. Additional direct and alternating currents may be applied to such a device, for example permitting an improved ion mobility device, including but not limited to FAIMS (high-Field Asymmetric waveform Ion Mobility Spectrometer).

As can be appreciated, various forms of electrical isolation and different types of voltages may be applied in exemplary embodiments of the present invention.

It will be further be appreciated by those skilled in the art that various embodiments of vessels as disclosed herein may further provide for various types of reactions—for example, inlets may provide reagents to induce reactions, including but not limited to ion/molecular reactions, ion/ion reactions, neutral/neutral reactions, or reactions via electron capture.

As should now also be apparent, ion sources exemplary of embodiments of the present invention (e.g. ion sources 10/10'/80/80'/110/110'/140/170) need not include only liquid samples, but may include gaseous samples (for example for use with gas chromatography GC-MS) and solid samples (for example, for use with fast atom bombardment (FAB); matrix-assisted laser desorption/ionization (MALDI)). Further, embodiments of the present invention may be used with not only liquid chromatography, but with other chromatographic methods for liquids, such as electrophoresis.

In alternate arrangements, vessels may be positioned inside a low pressure mass spectrometer, for example in the place of electron impact (EI) sources, or fast atom bombardment (FAB) sources.

Numerous approaches to achieving the desired pressure and flow rates, can be used. For example mechanical roughing pumps, venturi pumps, roots blower pumps; flow meters, pressure controllers may be utilized.

Of course, the above described embodiments are intended to be illustrative only and in no way limiting. The described embodiments of the invention are susceptible to many modifications of form, arrangement of parts, details and order of operation. The invention, rather, is intended to encompass all such modification within its scope, as defined by the claims.

What is claimed is:

1. An ion source, comprising:

at least one gas source, providing a pressurized gas;

a vessel defining a channel;

a gas inlet extending from the gas source into said channel, for introducing a gas flow into the channel;

a sample inlet extending into the channel for introducing a sample within said channel;

an ionizer to ionize the sample in the channel;

an outlet extending from said channel into a region defined by a plenum;

said vessel sufficiently sealed to allow said channel to be pressurized, at a pressure in excess of 100 Torr;

and wherein said at least one gas source maintains the pressure of the channel at a pressure in excess of 100 Torr and the pressure exterior to said channel in said region defined by said plenum at a pressure in excess of 0.1 Torr and provides a gas flow that sweeps across said ionizer to guide and entrain ions from said ionizer to said outlet.

2. The ion source of claim 1, wherein a boundary between said gas inlet and said channel creates a turbulent region of mixing in said channel in for mixing ions from said ionizer with said gas.

3. The ion source of claim 1, wherein said pressure of said channel is maintained in excess of 760 Torr.

4. The ion source of claim 1, further comprising a heat source for heating at least a portion of said channel to aid in producing said ions.

5. The ion source of claim 4, further comprising a second heat source for heating at least a portion of said sample in said sample inlet.

6. The ion source of claim 4, further comprising a second heat source for heating gas in said gas inlet.

7. The ion source of claim 1, further comprising at least one additional ionizer extending into said channel for producing ions within said channel to be entrained by said pressurized gas.

8. The ion source of claim 1, further comprising at least one additional gas inlet for introducing pressurized gas into said channel.

9. The ion source of claim 1, further comprising at least one additional channel in said vessel.

10. The ion source of claim 1, wherein said channel is generally cylindrical and the length to diameter ratio of said channel is greater than 3.

11. The ion source of claim 9, wherein the length to diameter ratio of said channel is greater than 5.

12. The ion source of claim 10, wherein the length to diameter ratio of said channel is greater than 10.

13. The ion source of claim 1, further comprising a chamber in direct communication with said channel and held at a pressure below that of said channel, wherein said chamber directs said ions to said mass spectrometer.

14. The ion source of claim 1, wherein said ionizer comprises an electrospray ion source.

15. The ion source of claim 1, wherein said ionizer comprises an atmospheric pressure chemical ionization (APCI) source.

16. The ion source of claim 1, wherein said ionizer comprises a matrix assisted laser desorption and ionization (MALDI) source.

17. The ion source of claim 1, wherein said ionizer comprises an atmospheric pressure, photoionization (APPI) source.

18. The ion source of claim 1, further comprising a turbulizing grid positioned within said channel to create a turbulent region of mixing in said channel in for mixing ions from said ionizer with said gas.

19. The ion source of claim 1, where said channel is cylindrical.

20. The ion source of claim 1, where said channel has a rectangular cross-section.

21. The ion source of claim 1, further comprising electrodes to attract said ions toward said mass spectrometer.

22. The ion source of claim 21 wherein said electrodes are proximate said ionizer.

23. The ion source of claim 1, wherein said vessel comprises multiple channels and wherein at least one electrode is located within each one of said channels to selectively guide ions within said channel.

24. The ion source of claim 1, wherein said channel is configured to establish a substantially laminar flow near said outlet.

25. The ion source of claim 1, further comprising a voltage source applying a voltage to at least one of said vessel and said ionizer.

26. The ion source of claim 25, wherein said voltage source comprises an RF voltage source.

27. The ion source of claim 26, wherein said voltage source further comprises a DC voltage source.

28. The ion source of claim 1, wherein a sampling orifice to a mass spectrometer extends from said channel at an angle to said channel.

29. The ion source of claim 1, wherein said gas inlet produces a pipe flow to said channel.

30. The ion source of claim 28, wherein said orifice extends at right angles to said channel.

31. The ion source of claim 28, wherein said channel includes a near 90° bend and said sampling orifice extends orthogonally to said bend.

32. The ion source according to 1, further comprising a second outlet to serve as an exhaust for said vessel.

33. A method of providing ionized particles to a mass spectrometer, said method comprising:

providing a guide channel;

introducing ions within said guide channel;

establishing a substantially fixed pressure and flow of transport gas in said guide channel, to entrain and guide said ions to exit from said channel to an inlet of said mass spectrometer in a substantially laminarized flow, wherein said flow of transport gas is between 1 and 50 standard liters per minute (SLM); and wherein said fixed pressure is in excess of 100 Torr in said channel, and the pressure exterior to said channel proximate an outlet of said channel is at a pressure in excess of 0.1 Torr.

34. The method of claim 33, further comprising creating a region of turbulent flow within said channel wherein said ions are provided into said turbulent flow to mix with said flow of transport gas.

35. The method of claim 34, wherein said creating comprises suddenly expanding said flow of transport gas to create said region of turbulent flow.

36. The method of claim 35, wherein said introducing comprises introducing ions from an electrospray tip, maintained at a potential above said channel.

37. The method of claim 35, wherein said introducing comprises introducing ions from an atmospheric pressure chemical ionization (APCI) source.

38. The method of claim 35, wherein said introducing comprises introducing ions from a matrix assisted laser desorption and ionization (MALDI) source.

39. The method of claim 35, wherein said introducing comprises introducing ions from an atmospheric pressure, photoionization (APPI) source.

40. A method of providing ions, comprising:

providing a vessel defining a channel said vessel comprising a gas inlet extending into said channel, an ionizer extending into the channel to ionize a sample in the channel; and an outlet extending from said channel to guide ions to an entrance of an analyser;

providing ions from said ionizer into the channel;

maintaining the pressure of the channel at a pressure in excess of 100 Torr, maintaining the pressure exterior to said channel at said outlet at pressure in excess of 0.1 Torr;

introducing a gas flow from a gas source at a non-ambient pressure into the channel to sweep across said ionizer to guide and entrain ions from said ionizer to said outlet.

41. An analysis device for analyzing molecules or atoms, comprising:

an ion source, comprising:

at least one gas source, providing gas;

a vessel defining a channel;

a gas inlet extending from the gas source into said channel, for introducing a gas flow into the channel from said gas source, to maintain the pressure of said channel in excess of 100 Torr;

a sample inlet extending into the channel for introducing sample within said channel;

an ionizer to ionize the sample in the channel;

an outlet extending from said channel;

said vessel sufficiently sealed to allow said channel to be pressurized, at a pressure in excess of 100 Torr;

an analyser stage for analysing ions from said ion source, said analyser having an inlet in flow communication with said outlet of said ion source;

wherein the pressure a region connecting said inlet of said analyser stage to said ion source is at a pressure in excess of 0.1 Torr and wherein said at least one gas source provides a gas flow that sweeps across said ionizer to guide and entrain ions from said ionizer to said outlet.

42. The analysis device of claim 41, further comprising a second heat source for heating at least a portion of said gas in said gas inlet.

43. A method of providing ions, comprising:

providing a vessel defining a channel said vessel comprising a gas inlet extending into said channel, at least one sample inlet extending into the channel; and an outlet extending from said channel to guide ions to an entrance of an analyser; providing a voltage between the sample inlet into the channel, and said channel to produce electrospray ions; introducing a gas flow from a gas source at a non-ambient pressure into said channel to entrain electrospray ions and guide electrospray ions to said outlet;

wherein said gas source maintains the pressure of the channel at a pressure in excess of 100 Torr and the pressure exterior to said channel proximate said outlet at a pressure in excess of 0.1 Torr.

44. The method of claim 43, further comprising turbulizing the gas flow proximate the sample inlet into the channel to aid in desolvation.

45. The method of claim 43, further comprising providing at least two adjacent electrospray inlets extending into said channel.

46. The method of claim 43 further comprising providing a corona needle in the channel.

* * * * *